Aug. 15, 1944.    H. B. YOUNG    2,355,689
DETONATING CUP CRIMPER
Filed Jan. 23, 1943

Inventor
Herbert B. Young
By C. E. Herrstrom & H. E. Thibodeau
Attorneys

Patented Aug. 15, 1944

2,355,689

UNITED STATES PATENT OFFICE 2,355,689

DETONATING CUP CRIMPER

Herbert B. Young, Kenvil, N. J.

Application January 23, 1943, Serial No. 473,301

2 Claims. (Cl. 86—39)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for crimping detonating cups.

The cups, which the contrivance is designed to close by crimping, comprise hollow cylindrical cups filled with a detonating substance, and having an inturned flange that cooperates with a disk in the top of the cup, and which when pressed down upon the disk completes the closure. It is important that the crimping be complete and uniform.

Heretofore the loading sleeve in which the cup supporting member is located has been unyielding, consequently the downward movement of the crimping plunger was positively limited by the sleeve with the result that the flange of the cup was sometimes distorted and frequently not crimped enough, resulting in an imperfect closure.

The object of this invention is to overcome this difficulty, which I achieve by providing a yielding support for the loading sleeve that will enable it to move downward sufficiently to complete the crimping operation and to assure that the flange of the cup is closely folded or crimped upon the closure disk of the cup.

Figure 1:
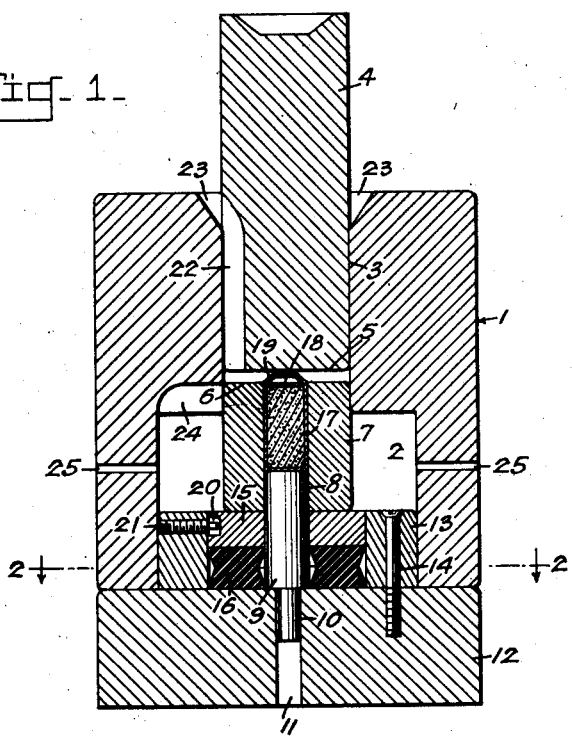
Figure 1 is a vertical central section of the device.
Figure 2:
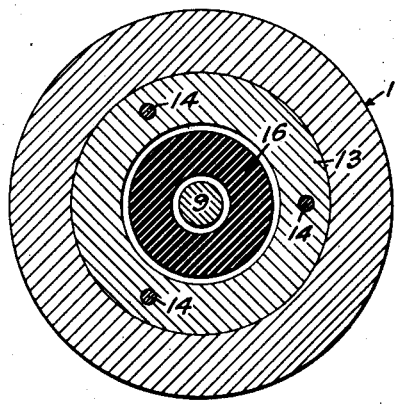
Figure 2 is a cross section on the line 2—2 of Figure 1.

In the drawing, 1 indicates the main body made with a chamber 2 at its lower end and a bore 3 to receive the plunger 4, flat at its lower end as at 5 for engagement with the flat surface 6 of the loading sleeve 7 which has a central bore 8 for the reception of the cylindrical member 9 reduced at its lower end to form a shank 10 fitting snugly in the bore 11 in the base 12.

Within the chamber 2 and resting on the base 12 is a ring 13 which may be secured to the base by screws 14 located at suitable intervals.

In the ring 13 and between the disk 15 and the upper surface of base is a ring 16 of rubber or other suitable resilient material. The disk 15 is apertured for the passage of the upper part of the member 9 upon which the disk has a snug sliding fit. The upper part of the bore 8 in the loading sleeve 7 forms the chamber for the detonating cup 17, which in the present instance comprises a cup having a disk 18 in its throat forming a part of the closure for the cup and an inturned flange 19 pressed down upon the disk by the plunger 4 to complete the closure.

In the crimping operation it is important that the disk 15 move downward slightly and evenly, and to permit this disk movement a recess 20 is provided in the periphery of the disk, for the reception of the end of a screw 21 in the ring 13.

The fits between the moving parts of the organization are very close so as to assure their true and accurate vertical movement.

The plunger is recessed as at 22, the recess leading to the conical annular recess 23 at the top of the body 1. This recess opens at its lower end into the lower end of the plunger bore 3. Adjacent to the top of the loading sleeve the body 1 is recessed as indicated at 24, which recess opens into the chamber 2, the arrangement being obviously for the purpose of exhausting the air between the lower end of the plunger and the top of the loading sleeve, the air from the chamber 2 escaping through suitable vents 25 in the wall of body 1. In short, notwithstanding the close fits between the moving parts, they operate free of air cushions that would otherwise be present.

The ring 16 is, as intimated, preferably made of rubber and will be of appropriate resiliency, but coil springs or any other resilient medium may take its place wherewith a uniform annular cushion effect is obtained.

In operation the plunger moves down upon the interned flange 19 of the cup, and folds the flange upon the disk, lightly at first. At this stage the plunger will be in contact with the flange, but not quite in engagement with the loading sleeve. A very small further movement of the plunger will bring it into engagement with the sleeve which will yield slightly and permit the plunger to firmly set the flange on the cup disk.

I claim:

1. In a machine for crimping detonator cups, in combination, a body having a chamber therein and an open end bore communicating with the chamber, a crimping plunger in the bore, resilient means supported in said chamber, a disk supported by the resilient means and means for guiding the disk in its vertical movement, a sleeve seated on said disk and provided with a through bore, a member supported by the body and extending through the disk and part way into the bore in the sleeve, leaving a chamber in the sleeve above said member for the reception of the detonator cup to be crimped, and means for guiding the sleeve in its vertical movements.

2. In a machine for crimping detonator cups, in combination, a body having a chamber therein and an open end bore communicating with the chamber, a crimping plunger in the bore, a ring in the bottom of the chamber, a disk fitted for snug vertical movement in the ring and provided with a central aperture, resilient means interposed between the disk and the bottom of the chamber, a through bored sleeve mounted on the disk, a member supported on the body and extending through the disk and partly through the bore in the sleeve, leaving a chamber in the sleeve for the reception of the cup to be crimped, and means for venting the chamber.

HERBERT B. YOUNG.